United States Patent Office

3,575,854
Patented Apr. 20, 1971

3,575,854
RAPID SETTLING OF GELATINOUS
PRECIPITATES
Raymond Richards, Detroit, Mich., assignor to
M & T Chemicals Inc., New York, N.Y.
No Drawing. Filed Apr. 14, 1969, Ser. No. 816,055
Int. Cl. C02c 5/02
U.S. Cl. 210—50                                          8 Claims

ABSTRACT OF THE DISCLOSURE

A process is provided for the rapid settling of gelatinous, flocculent precipitates of hydrous heavy metal oxides from waste effluent streams by precipitating the metals present in the streams as hydoxides in the presence of a suspended, finely divided heavy solid settling agent which is insoluble in aqueous medium and which has a minimum specific gravity of 3.5, the weight ratio of the settling agent to metal content of the precipitate being a minimum of .7 to 1.0.

---

Generally speaking, this invention relates to the removal of undesirable metallic content from waste effluent streams, the metallic content being toxic and/or in other ways undesirable for disposal with other waste effluent into sewers, rivers or streams because of their well-known pollutant characteristics. More particularly, this invention relates to a process for the rapid settling of the gelatinous, flocculent precipitates of such metal content from waste effluent streams so as to reduce substantially the cost of equipment and/or space necessary for such removal and to reduce substantially the time and labor involved in such removal.

With the ever-increasing, and very well-known, problem of pollution of water caused by the vast industrial operations of our economy, there is a concern with the ways of reducing and/or eliminating pollution of waste effluent waters, and there is a corresponding concern with regard to economically useful methods for removal of toxic content of waste effluent so as to provide producers of such pollutants with means economically feasible for the removal of such pollutants in a manner so as to permit their operations to continue on a profitable basis. For example, the general public is becoming more aware every day of the problem of pollution, and, as a consequence, regulatory authorities are promulgating further restrictions as to pollution of streams and air. Therefore, commercial operators must provide means for removing from their waste effluent waters resulting from their operations the pollutants caused by their operations, while at the same time at a cost which permits their continued operation on an economically profitable basis. It is obvious that if a particular industrial operation cannot comply with such regulations on a profitable basis, then either pollution continues or the particular industrial operation must cease operations.

As noted above, this invenion relates to the particular problem of toxic metallic content in waste effluent waters from such industrial operations as, for example, electroplating and other metal finishing processing plants. Where the regulatory authorities insist upon the waste effluent from metal finishing processing plants being free from most of the heavy metals involved in such processing performed in those plants, such metals as, for example, nickel, chromium, zinc, cadmium and copper, are restricted to a low percentage of the entire content of the waste effluent, whether they are present as solutes or present as insoluble suspended solids, as is well known.

As will be understood, metals of the type discussed herein are usually treated to form the precipitated hydroxides thereof. For example, nickel-bearing waste rinse waters from processing operations performed after nickel plating, and prior to chromium plating, are generally treated with the other plant waste waters. Nickel, and most other heavy metals present, are precipitated by raising the pH by the addition of an alkali. Such reactions are represented, for example, by the following formula:

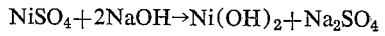
$$NiSO_4 + 2NaOH \rightarrow Ni(OH)_2 + Na_2SO_4$$

In addition, chromates may be present from such industrial metal finishing operations in the effluent from certain rinses thereof. When such chromates are present, they are generally reduced before mixing with the nickel-bearing rinse waters, and chromium, iron, copper are generally precipitated as the hydroxides thereof by a high pH treatment with alkali. As representative of such reaction, one may note the following formulae:

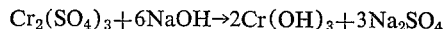
$$Cr_2(SO_4)_3 + 6NaOH \rightarrow 2Cr(OH)_3 + 3Na_2SO_4$$
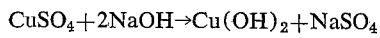
$$CuSO_4 + 2NaOH \rightarrow Cu(OH)_2 + NaSO_4$$

As will be understood further, these hydroxides are all very highly hydrated, and as a consequence, are flocculent, voluminous, gelatinous and slow-settling. Because of this, the waste effluents containing such precipitates are extremely difficult to handle.

One of the difficulties encountered in handling such precipitates is the fact that they are not easily removed by filtration simply because they have a tendency to rapidly clog filtration apparatus by blinding the filter and requiring not only extensive and expensive filtration equipment, but frequent shutdown in order to clean the filtering equipment, all of which requires costly and almost continuous supervision, thus increasing the cost of labor involved in such filtration operations. In the past, attempts have been made to overcome this filtration problem by providing for space where such precipitates may settle of their own accord for a period of time. Generally, the effluent containing the precipitated hydroxides is sent to a large outdoor lagoon with a retention time greater than at least four hours. The precipitates will, under such circumstances, finally settle, and the clear effluent free from suspended solids and dissolved heavy metals flows to a stream, lake or sewer. However, such operations require periodic shutdown of such a lagoon for removal of the voluminous, gelatinous sludge which has settled in the lagoon. Such operations include pumping off the supernatant water, allowing the sludge to dry and compact in hot dry weather and then removing the compacted sludge mechanically for ultimate disposal on an approved dumping ground.

As will be understood, such operations not only require extensive space for providing such a lagoon, but also require extensive manpower for the periodic cleaning of the lagoon. In addition, and most importantly, such shutdown requires shutdown of the whole operation in order to remove the settled sludge and a separate lagoon must be provided so that it may be used alternatively while the other is being cleaned. Of course, as is obvious, the latter arrangement requires further space and/or expense in providing such separate lagoons.

By contrast, and quite unexpectedly, it has now been found in accordance with this invention, that rapid settling of said gelatinous, flocculent precipitates is achieved in little more than a few minutes in some cases, depending upon the volume involved, by precipitating the metallic content of waste effluents, as noted above, as hydroxides by raising the pH in the presence of a suspended finely divided heavy solid which is insoluble in the aqueous medium in which the precipitation occurs. With such an arrangement, the particles of the heavy suspensoid and the flocculent hydroxides undergo a surface reaction attaching thmeselves to one another in such a manner that more rapid settling of the two solids occurs together. The finely divided heavy solid settling agent used possesses certain characteristics including the fact, as noted above, that the solids are insoluble in the aqueous medium in which the reaction occurs, and they must have a minimum specific gravity of 3.5. Further, they must possess sufficient fineness in order to provide a large surface area for contact with the flocculent precipitates with which they will combine, with the particle size being as uniform as practicable in any commercial form in which they are obtained.

With such an arrangement, rapid settling occurs thus eliminating the need for large retention pools and/or lagoons, as well as expensive filtration equipment. Further, with such an arrangement, the waste effluent from such metal processing operations can be eliminated rapidly and discharged into public streams, rivers and/or sewers and/or recirculated for further operations without the need for extensive storage facilities in order to remove the undesirable metallic toxic content from such waste effluents.

Accordingly, it is one object of this invention to provide a process for the removal of undesirable and/or toxic metallic content from the waste effluent of metal processing operations. In addition, it is another object of this invention to remove said metallic content in the form of the precipitated hydroxides thereof by providing for the rapid settling of such precipitated content.

It is a further object of this invention to provide for such removal and rapid settling in a manner so as to eliminate the need for expensive and/or extensive filtration equipment and space necessary for providing extensive settling tanks and/or lagoons for the usual slow settling which is characteristic of such precipitated metallic hydroxides.

With the foregoing and additional objects in view, this invention will be described in more detail and other objects and advantages will be apparent from the following description and the appended claims.

Before describing this invention in more detail, it may be well to note that this invention has been found applicable to a wide variety of metals found in the waste effluent of metal processing operations such as aluminum, iron, nickel, zinc, copper, chromium, cadmium, as well as other gelatinous precipitates of the same physical characteristics. For example, satisfactory results have been achieved in accordance herewith and under satisfactorily and ecomomicaly attractive conditions in commercial scale operations by precipitating the metallic content of waste effluents from metal finishing processing plants by precipitating the metals as hydroxides by the addition of an alkali in the presence of a suspended finely divided heavy solid treating agent, which agent has a minimum specific gravity of 3.5. Further, the treating agent must have sufficient fineness to provide a large surface area for contact with the flocculent precipitates and preferably the individual particles thereof are as uniform as possible. The ratio of treating agent to metal as metal present in the metallic hydroxide is within the range of between about .7:1 to 4.5:1. With such an arrangement, the combined settling agent particles and flocculent metallic precipitate settle rapidly as a sludge.

In considering generally the conditions for achieving the most enhanced results in connection herewith, which conditions are more specifically set forth below, one may note that satisfactory rapid settling of the flocculent precipitates, as described herein, occurs when the concentration of the metallic hydroxide in the waste effluent being treated is not much below 200 p.p.m. (parts per mililon) calculated as metal. The concentration of the treating agent in excess of this amount does not retard the settling of the metallic hydroxide precipitate and/or of other precipitates of similar characteristics, in accordance herewith.

For example, and as purely illustrative of the results achieved in accordance herewith, one may note as a representative effluent one of those which may come from commercial electroplating operations and which contains 50 p.p.m. of $Cr^{+++}$ present as chromium sulfate ($Cr_2(SO_4)_3$) in the presence of an equal concentration of suspended barium chromate ($BaCrO_4$) as the settling agent. Upon the addition of the alkali sodium hydroxide (NaOH), the pH is raised to 8.5, thus causing settling within an hour as a sludge of the combined metallic precipitate and the finely divided dispersed settling agent to a volume of about 6–7 times greater than that of the wet $BaCrO_4$ added to promote the settling. As noted above, satisfactory results are achieved in accordance herewith and rapid settling is obtained when the metal content is at least 50 p.p.m. or higher. It should be understood, and as well known, that this concentration is easily achieved with the well-known procedure of counter-flowed rinses as is used in industrial practice.

A preferred cycle of operation in accordance herewith for bringing about the rapid settling of the gelatinous, flocculent metallic precipitates as noted herein includes admixing with the effluent from metallic finishing operations a finely divided settling agent having a minimum specific gravity of 3.5, and with the individual particles thereof being as uniform as possible, and preferably with at least 5% of the settling agent added being not over 5 microns, and with the ratio of settling agent to metal present in the metallic hydroxide being within the range of between about .7:1 to 4.5:1, and preferably 1:1. It should be understood, further, and in accordance herewith and as well known, that the pH of the effluent being treated must be raised in order to bring about precipitation of the particular metals contained in the effluent. This, of course, as is well known, may be achieved by the addition of the alkali to bring about the precipitation. However, the pH range will vary depending upon various factors and conditions and including other impurities which may be present in the effluent. However, the general range for the pH will be somewhat between about 3–10, as is well known, for the particular metals noted above.

It has been found, in accordance herewith, that satisfactory results are achieved utilizing, but not limited to, settling agents such as barium chromate, barium phosphate, barium sulfate, aluminum oxide, chromic oxide, iron oxide, lead carbonate, lead chromate, chromic fluoride, cobaltous oxide, and manganese dioxide. It will be understood, and as is well known, that other substances may very well be used as long as they retain the specific desired characteristics in accordance herewith of a high density, and being insoluble in the effluent medium, as well as being of sufficient fineness to provide large surface area in order to agglomerate properly with the gelatinous, flocculent hydroxides formed, in accordance herewith. In addition, the individual particles thereof should be as uniform as possible, and preferably with 5% of the settling agent having a particle size of 5 microns or less.

As purely illustrative of the results achieved in accordance herewith, one may note the following examples. It is to be understood, however, that these examples are being presented with the understanding that they are to have no limiting character on the broad disclosure of the invention as generally set forth herein and as directed to men skilled in the art.

EXAMPLE 1

A 250 ml. sample of a water solution was prepared containing 50 p.p.m. Zn and 70 p.p.m. of $C\overline{N}$. $BaSO_4$ was added in amount of 100% by weight based on the weight of the zinc present. Thereafter, 5 ml. of 5.25% of sodium hypochlorite was added, and after allowing the oxidation of the $C\overline{N}$ to proceed for one minute with vigorous agitation, the pH was lowered from 11.0 to between about 8.6 to 8.8 with the addition of $H_2SO_4$, and the insolubles were allowed to settle for 5 minutes. An analysis of the supernate to determine residual zinc content indicated zinc being present in the amount of 5.8 p.p.m. in the form of $Zn(OH)_2$.

EXAMPLE 2

A 250 ml. sample of a water solution was prepared in the same manner as in Example 1, except that the $BaSO_4$ was added in the amount of only 20% by weight based on the weight of the zinc. The same procedure was followed in allowing the oxidation of the $C\overline{N}$ to proceed for 1 minute with vigorous agitation, and with the pH being lowered by the addition of $H_2SO_4$. The analysis of the supernate in this example indicated a residual zinc content of 9.4 p.p.m. in the form of $Zn(OH)_2$.

EXAMPLE 3

In this control example, a similar 250 ml. sample of water solution was prepared in the same manner as in Example 1, except that no $BaSO_4$ was added. The water solution was treated in the same manner with 5 ml. of 5.25% sodium hypochlorite and after allowing the oxidation of the $C\overline{N}$ to proceed for 1 minute with vigorous agitation, the pH was lowered from about 11.0 to between about 8.6–8.8 with the addition of $H_2SO_4$, and the insolubles were allowed to settle for 5 minutes. In the analysis of the supernate resulting from this example, a residual zinc content of 14.3 p.p.m. in the form of $Zn(OH)_2$ was found.

From a comparison of the three examples noted above, it is clearly evident that the addition of the settling agent, in accordance herewith, is effective in removing the suspended metallic values in a waste effluent and that the metal/settling agent ratios of the three examples noted above clearly show that the addition of the settling agent in accordance herewith enhances the desired result of removing as much of the metallic content of waste effluents as possible. The results from Example 1, for example, in which the weight ratio of settling agent to metallic content was 1:1, the undesirable metallic content was reduced about 90%, whereas in Example 3 where no settling agent was used, the metallic content was reduced only about 72%, while a comparison of the three examples indicates that the process, in accordance herewith, is dependent upon the metal/settling agent ratio.

Accordingly, and as will be apparent from the foregoing, there are provided in accordance herewith, methods for removing the undesirable and/or toxic metallic content of waste effluents, particularly from metal finishing and/or processing operations which methods effectively reduce the metallic content to an amount within a range which is acceptable for introduction of the waste effluent into public streams and/or rivers, thus avoiding the pollution of the latter. In addition, the methods in accordance herewith provide for the rapid settling out of the precipitated hydroxides of the metal content of such waste effluents in a manner avoiding the need for costly filtration techniques and equipment, as well as storage tank and/or pool facilities which were required in the past for providing the extensive settling times necessary to settle out the gelatinous, flocculent precipitates derived from the metallic content of such waste effluents. Further, with the method as taught in accordance herewith, a substantial reduction in labor utilization is achieved, thus making the methods in accordance herewith highly advantageous commercially.

While the methods herein disclosed form preferred embodiments of this invention, this invention is not limited to those specific methods, and changes can be made therein without departing from the scope of this invention which is defined in the appended claims.

I claim:

1. A process for removing metals as the hydroxides thereof selected from the group consisting of zinc, aluminum, nickel, chromium III, iron, cobalt, cadmium, manganese II, manganese IV, tin II, tin IV, copper, and mixtures thereof present as contaminants in waste effluent streams by the rapid settling of the gelatinous, flocculent precipitates of the hydrous oxides of such metals, comprising precipitating the metals present in such waste effluent streams containing such metals as said hydrous oxides by adjusting the pH to between about 3–10 in the presence of a suspended, finely divided heavy solid settling agent, the ratio of the said settling agent to the said metals present being within the range of between about .7:1.0 and 4.5:1 by weight, the said settling agent being insoluble in the said precipitating environment and having a minimum specific gravity of about 3.5 with the individual particles thereof being as uniform as possible, agglomerating the said precipitate and the said settling agent for the rapid settling thereof, rapidly settling the agglomerate formed by the said agglomerating step into a sludge, and drawing off the supernate from said settling step.

2. A process as recited in claim 1 in which the said ratio of the said settling agent to the said metals present is about 1:1 by weight.

3. A process as recited in claim 1 in which at least 5% of the individual particles of the said settling agent are of a size of 5 microns or less.

4. A process as recited in claim 1 in which the said settling agent is selected from the group consisting of barium chromate, barium phosphate, barium sulfate, aluminum oxide, chromic oxide, iron oxide, lead carbonate, lead chromate, manganese dioxide, chromic fluoride, cobaltous oxide, and mixtures thereof.

5. A process as recited in claim 1 in which said precipitating step is carried out by the addition of an alkali.

6. A process as recited in claim 1 in which said waste effluent streams to be treated are counterflowed to bring the concentration of metal present therein to 50 parts per million or more calculated as metal present in the said metallic precipitates.

7. A process for the rapid settling of the gelatinous, flocculent precipitates of hydrous heavy zinc oxides from waste effluent streams comprising precipitating the zinc present in such waste effluent streams containing such zinc in the presence of a suspended, finely divided barium sulfate and a soluble hypochlorite at a pH of between 9–10, the ratio of the said barium sulfate to the said zinc present being within the range of between about .7:1.0 and 4.5:1 by weight, the said barium sulfate being insoluble in the precipitating environment and having a specific gravity of about 3.5 with the individual particles thereof being as uniform as possible, agglomerating the said precipitate and the said barium sulfate for the rapid settling thereof, rapidly settling the agglomerate formed by the said agglomerating step into a sludge, and drawing off the supernate from the said settling step.

8. A process for removing the nickel present in waste effluent streams by the rapid settling of the gelatinous, flocculent precipitates of the hydrous heavy oxides of such nickel, comprising precipitating the nickel present in such waste effluent streams by the addition of sodium hydroxide, and with a pH of between about 3–10 in the presence of a suspended, finely divided barium sulfate, the ratio of the said barium sulfate to the said nickel present being within the range of between about .7:1.0 and 4.5:1 by weight, the said barium sulfate being insoluble in the said precipitating environment and having a minimum specific gravity of about 3.5 with the individual particles thereof being as uniform as possible, agglomerating the said precipitate and the said barium sulfate for the rapid settling thereof, rapidly settling the agglomerate formed by the said agglomerating step into a sludge, and drawing off the supernate from the settling step.

References Cited

UNITED STATES PATENTS

| | | | |
|---|---|---|---|
| 3,142,638 | 7/1964 | Blaisdell et al. | 210—52 |
| 3,163,598 | 12/1964 | Yoshihara et al. | 210—47 |
| 3,347,787 | 10/1967 | Rhodes | 210—50X |

OTHER REFERENCES

Symons, G. E.: Coagulation, Water and Sewage Works, vol. 102, November 1955, pp. 470–475.

Hoover, C. R. et al.: Disposal of Waste Liquors from Chromium Plating, Ind. & Eng. Chem., vol. 33, January 1941, pp. 131–134.

MICHAEL ROGERS, Primary Examiner

U.S. Cl. X.R.

23—183; 210—51